United States Patent
Sano

(10) Patent No.: US 10,421,357 B2
(45) Date of Patent: Sep. 24, 2019

(54) AXLE APPARATUS

(71) Applicant: Komatsu Ltd., Tokyo (JP)

(72) Inventor: Shinya Sano, Tokyo (JP)

(73) Assignee: Komatsu Ltd., Tokyo (JP)

( * ) Notice: Subject to any disclaimer, the term of this patent is extended or adjusted under 35 U.S.C. 154(b) by 204 days.

(21) Appl. No.: 15/553,684

(22) PCT Filed: Jan. 27, 2017

(86) PCT No.: PCT/JP2017/003058
§ 371 (c)(1),
(2) Date: Aug. 25, 2017

(87) PCT Pub. No.: WO2018/138893
PCT Pub. Date: Aug. 2, 2018

(65) Prior Publication Data
US 2019/0100101 A1    Apr. 4, 2019

(51) Int. Cl.
*B60K 17/16* (2006.01)
*F16H 57/04* (2010.01)

(52) U.S. Cl.
CPC ............. *B60K 17/16* (2013.01); *F16H 57/04* (2013.01); *F16H 57/0424* (2013.01); *F16H 57/0436* (2013.01); *F16H 57/0447* (2013.01); *F16H 57/0479* (2013.01); *F16H 57/0483* (2013.01);
(Continued)

(58) Field of Classification Search
CPC ..... B60K 17/16; F16H 57/04; F16H 57/0424; F16H 57/0436; F16H 57/0447; F16H 57/0479; F16H 57/0483; F16H 57/0493; F16H 57/0441
See application file for complete search history.

(56) References Cited

U.S. PATENT DOCUMENTS 2,840,186 A * 6/1958 Nyland ............... F16H 57/0421
184/6.12
4,468,981 A * 9/1984 Ries ....................... B60K 17/16
180/370
(Continued)

FOREIGN PATENT DOCUMENTS

JP         58-73441 A    5/1983
JP         59-91924 U    6/1984
(Continued)

OTHER PUBLICATIONS

International Search Report dated May 9, 2017, issued for PCT/JP2017/003058.

*Primary Examiner* — Michael A Riegelman
(74) *Attorney, Agent, or Firm* — Locke Lord LLP

(57) ABSTRACT

An axle apparatus includes: an axle housing in which a machine part is disposed, the axle housing including a discharge port that discharges oil supplied to the machine part and a plurality of inflow ports into which the oil flows; a filter disposed outside the axle housing; a discharge pipe connecting the discharge port of the axle housing and the filter; a supply pipe of which one end side is connected to the filter, the other end side of the supply pipe being branched off and connected to the plurality of inflow ports; and a pump that causes the oil to circulate from the axle housing to the filter via the discharge pipe, and causes the oil to circulate from the filter to the axle housing via the supply pipe.

8 Claims, 15 Drawing Sheets

(52) U.S. Cl.
CPC ..... *F16H 57/0493* (2013.01); *F16H 57/0441* (2013.01)

(56) References Cited

U.S. PATENT DOCUMENTS

| | | | | |
|---|---|---|---|---|
| 8,267,827 | B2* | 9/2012 | Durbin | F16H 57/0423 475/159 |
| 8,428,818 | B2* | 4/2013 | Murahashi | B60B 11/06 180/339 |
| 2007/0068735 | A1* | 3/2007 | Mori | B60K 17/046 184/6.12 |
| 2009/0133952 | A1* | 5/2009 | Lindekugel | B60K 17/22 180/339 |
| 2009/0241655 | A1* | 10/2009 | Ingram | B60C 23/003 73/146.3 |
| 2013/0001018 | A1* | 1/2013 | Masuda | F16H 57/0426 184/6.12 |
| 2013/0323015 | A1* | 12/2013 | DeWald | B60K 17/344 415/1 |
| 2014/0041619 | A1* | 2/2014 | Yamauchi | B60K 7/0007 123/196 R |
| 2014/0091023 | A1* | 4/2014 | Long | F16H 57/0441 210/167.08 |
| 2014/0219848 | A1* | 8/2014 | Rabhi | F16C 33/306 418/24 |
| 2017/0356456 | A1* | 12/2017 | Handwerk | F04D 13/02 |
| 2019/0100101 | A1* | 4/2019 | Sano | F16H 57/04 |
| 2019/0128401 | A1* | 5/2019 | Hayes | F16H 57/0483 |

FOREIGN PATENT DOCUMENTS

| | | |
|---|---|---|
| JP | 3-7567 U | 1/1991 |
| JP | 3-85751 U | 8/1991 |
| JP | 2006-153236 A | 6/2006 |
| JP | 2008-115971 A | 5/2008 |
| JP | 2010-174950 A | 8/2010 |
| JP | 2013-011302 A | 1/2013 |
| JP | 2014-074485 A | 4/2014 |
| JP | 2016-217453 A | 12/2016 |
| WO | 2005/038305 A1 | 4/2005 |

\* cited by examiner

FRONT SIDE

AXLE APPARATUS

FIELD

The present invention relates to an axle apparatus.

BACKGROUND

A wheel-drive work vehicle includes an engine, a drive shaft that rotates by a drive force generated by the engine, and an axle apparatus coupled to the drive shaft (for example, refer to Patent Literature 1). The axle apparatus includes an axle housing, a differential that is housed inside the axle housing and coupled to a drive shaft, a transmission shaft to which a rotating force of the drive shaft is transmitted via the differential, and an axle shaft to which a rotating force of the transmission shaft is transmitted. Rotation of the axle shaft drives the wheels of the work vehicle. Machine parts such as a gear and a bearing that are housed inside the axle housing are immersed in oil for lubrication. Foreign substances such as a part of worn machine parts are mixed into the oil with the operation of the work vehicle. Therefore, the oil inside the axle housing is discharged by an oil circulating device, and passed through a filter for removing foreign substances. Then, the oil is returned to the inside of the axle housing again.

CITATION LIST

Patent Literature

Patent Literature 1: Japanese Laid-open Patent Publication No. 2010-174950 A

SUMMARY

Technical Problem

The above-described oil circulating device has a configuration in which a discharge pipe is connected from a discharge port of the axle housing to the filter, and a supply pipe to return the oil from the filter to an inflow port of the axle housing is connected. Usually, the number of discharge ports provided on the axle housing is one, and the number of inflow ports provided thereon is one. Therefore, the oil that has flowed into the inside of the axle housing from the supply pipe via the inflow port is introduced into the machine parts via internal pipes. However, with this configuration, it is necessary to lay pipes so as to thread the inside of the axle housing where various machine parts are disposed. This complicates the internal configuration of the axle housing and increases the size of a space needed inside the axle housing.

The present invention has been made in view of the above. It is an object of the present invention to provide an axle apparatus capable of suppressing complication of an internal configuration and saving a space.

solution to problem

According to an embodiment of the present invention, an axle apparatus, comprises: an axle housing in which a machine part is disposed, the axle housing including a discharge port that discharges oil supplied to the machine part and a plurality of inflow ports into which the oil flows; a filter disposed outside the axle housing; a discharge pipe connecting the discharge port of the axle housing and the filter; a supply pipe of which one end side is connected to the filter, the other end side of the supply pipe being branched off and connected to the plurality of inflow ports; and a pump that causes the oil to circulate from the axle housing to the filter via the discharge pipe, and causes the oil to circulate from the filter to the axle housing via the supply pipe.

Advantageous Effects of Invention

According to the present invention, there can be provided an axle apparatus capable of suppressing complication of an internal configuration and saving a space.

DESCRIPTION OF EMBODIMENTS

Hereinafter, an embodiment of an axle apparatus according to the present invention will be described with reference to the drawings. Note that this invention is not limited by this embodiment. Furthermore, constituent elements in the following embodiment include those replaceable and easily made by those skilled in the art or those substantially the same.

Figure 1:
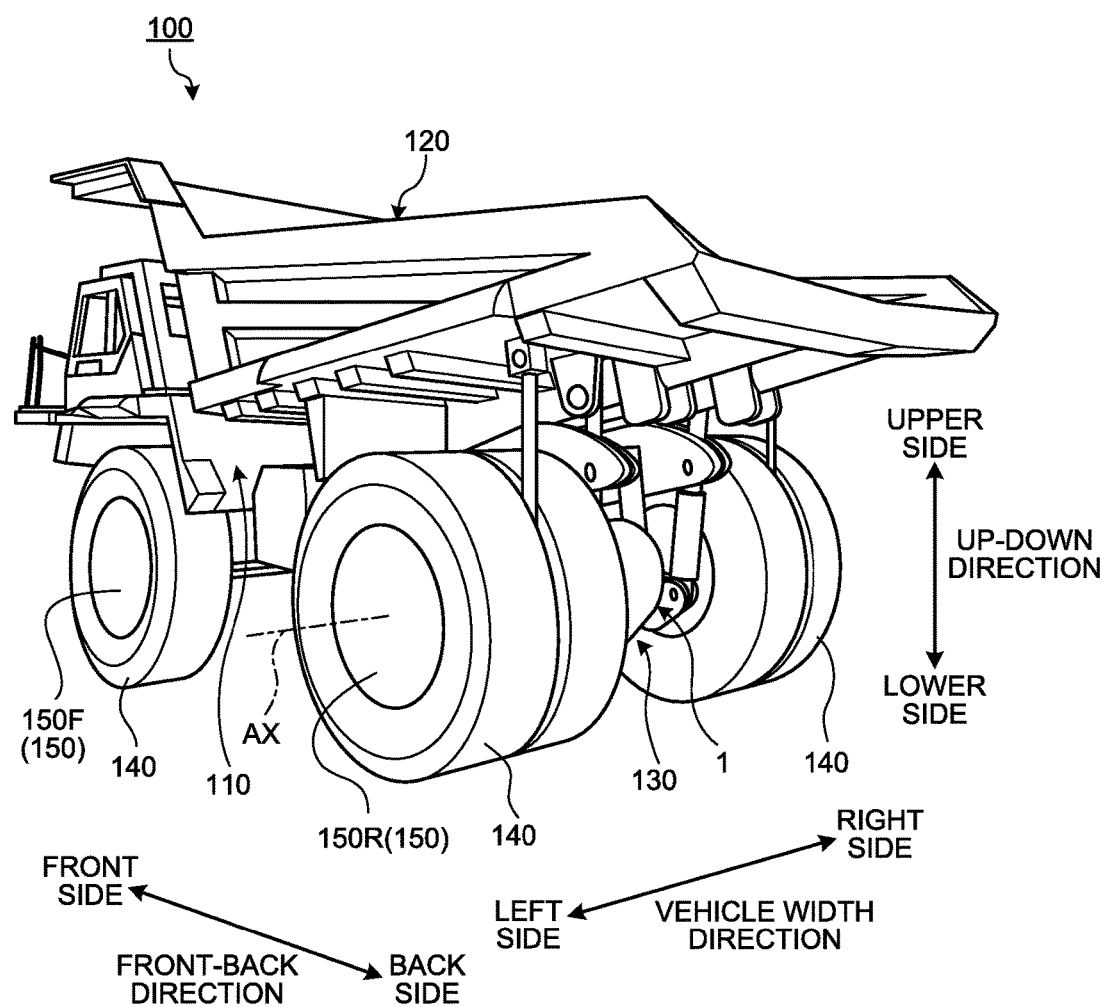
FIG. 1 is a perspective view illustrating an example of a work vehicle according to the present embodiment, as viewed from a back side.

FIG. 1 is a perspective view of an example of a work vehicle 100 according to the present embodiment, as viewed from a back side. In the present embodiment, the work vehicle 100 is a dump truck on which a cargo is loaded and which runs in an excavation site in a mine. In the following description, the work vehicle 100 is referred to as the dump truck 100 accordingly. Although hereinafter, a rigid-type dump truck will be illustrated as an embodiment, it should be understood that the work vehicle includes an articulate-type dump truck and a vehicle with tire series such as a wheel loader.

As illustrated in FIG. 1, the dump truck 100 includes a vehicle body frame 110, a dump body 120 supported by the vehicle body frame 110, and a travel device 130 that runs while supporting the vehicle body frame 110.

The travel device 130 includes a wheel 150 to which a tire 140 is fitted. The wheel 150 includes a front wheel 150F and a rear wheel 150R. The rear wheel 150R rotates around a rotation axis AX.

In the following description, a direction parallel to the rotation axis AX is accordingly referred to as the vehicle width direction, a traveling direction of the dump truck 100 as the front-back direction, and a direction perpendicular to each of the vehicle width direction and the front-back direction as the up-down direction.

One side of the front-back direction is the front side, and a direction opposite to the front side is the back side. One side of the vehicle width direction is the right side, and a direction opposite to the right side is the left side. One side of the up-down direction is the upper side, and a direction opposite to the upper side is the lower side. The front wheel 150F is disposed further to the front than the rear wheel 150R. The front wheel 150F is disposed on each side of the vehicle width direction. The rear wheel 150R is disposed on each side of the vehicle width direction. The dump body 120 is disposed above the vehicle body frame 110.

The vehicle body frame 110 includes an engine that is a drive source. In the present embodiment, the engine includes an internal combustion engine such as a diesel engine. The dump body 120 is a member on which a cargo is loaded.

The travel device 130 includes an axle apparatus 1 that transmits, to the rear wheel 150R, a drive force generated by the engine. The drive force generated by the engine is transmitted to a drive shaft via a transmission device. The axle apparatus 1 is coupled to the drive shaft. The axle apparatus 1 transmits, to the rear wheel 150R, the drive force of the engine that is supplied via the transmission device and the drive shaft. The rear wheel 150R rotates around the rotation axis AX by the supplied drive force. This causes the travel device 130 to run.

Figure 2:
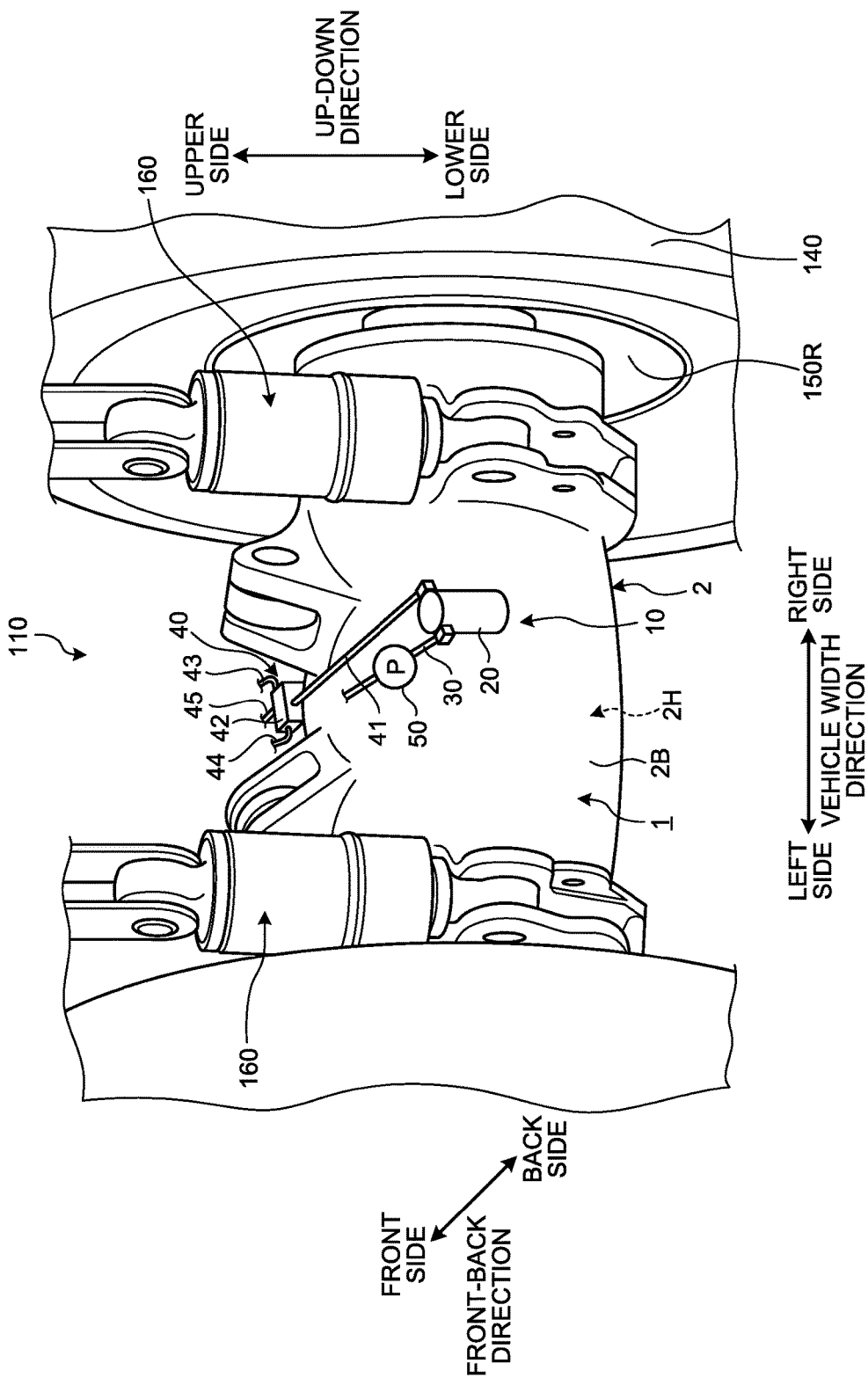
FIG. 2 is a view illustrating a part of an axle apparatus according to the present embodiment, as viewed from the back side.
Figure 3:
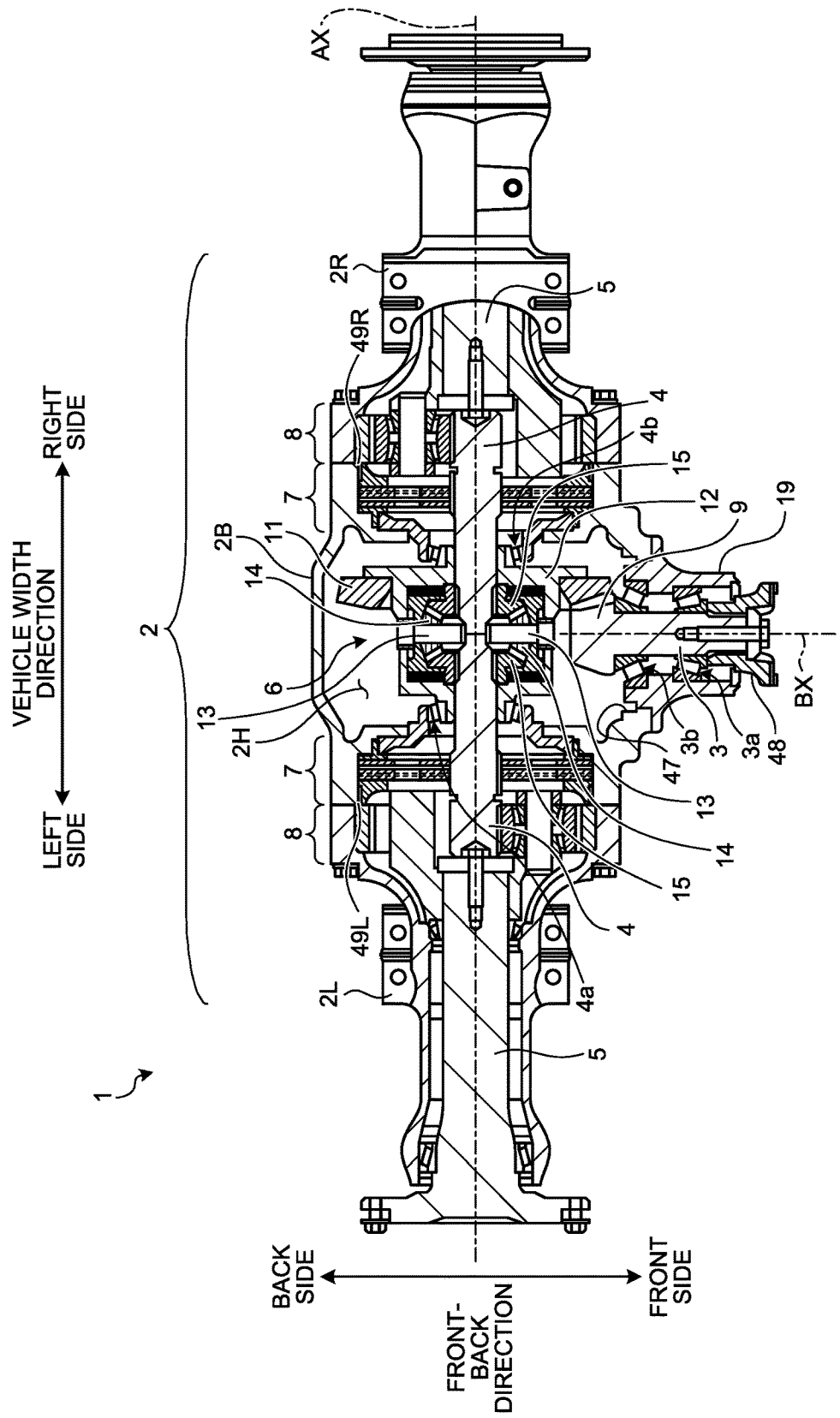
FIG. 3 is a cross-sectional view illustrating an example of the axle apparatus according to the present embodiment.
Figure 4:
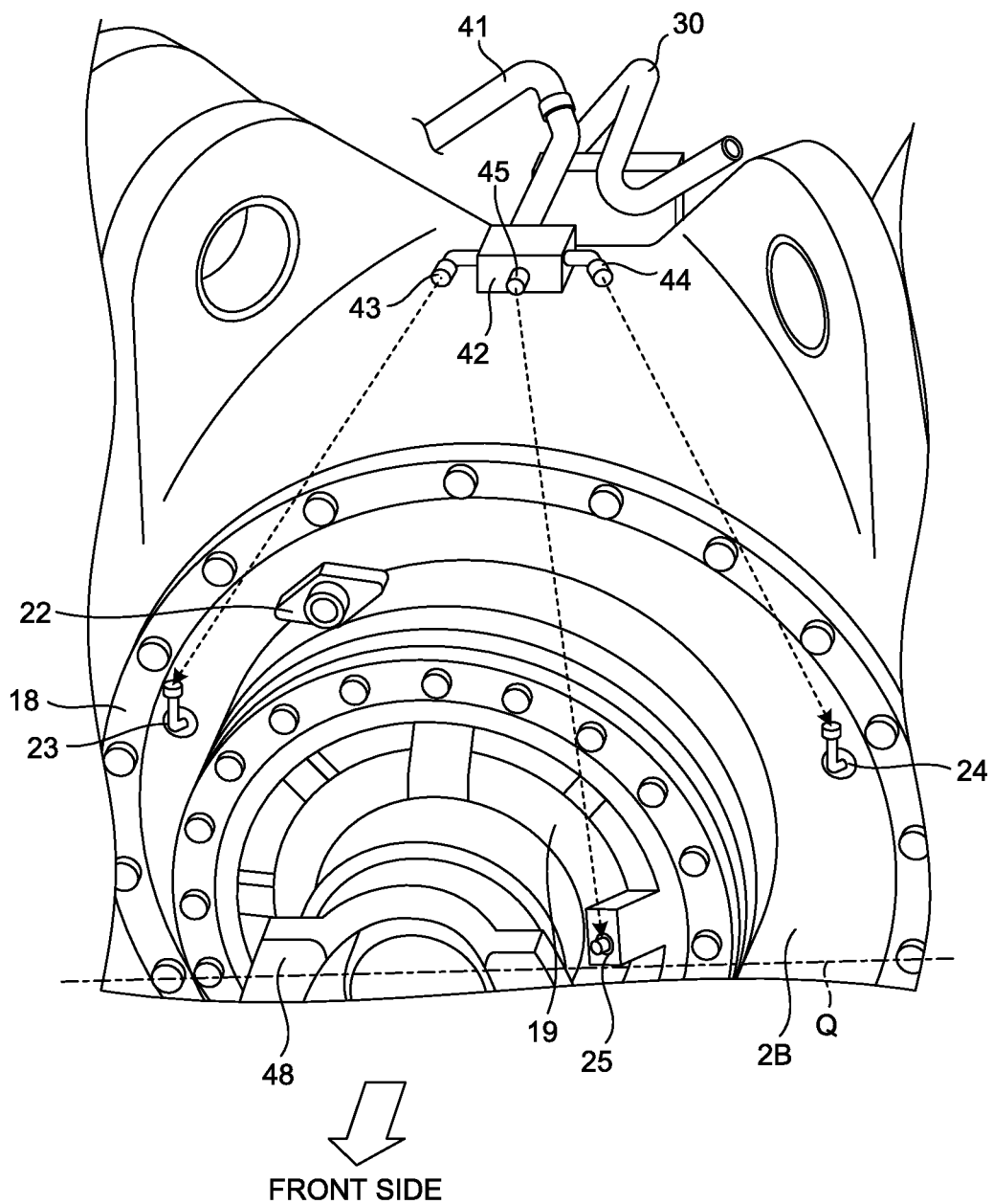
FIG. 4 is a view illustrating a part of the axle apparatus according to the present embodiment, as viewed from a front side.

FIG. 2 is a view illustrating a part of the axle apparatus 1 according to the present embodiment, as viewed from the back side. FIG. 3 is a cross-sectional view illustrating an example of the axle apparatus 1 according to the present embodiment. FIG. 4 is a view illustrating a part of the axle apparatus 1 according to the present embodiment, as viewed from the front side. In the present embodiment, the axle apparatus 1 is a rear axle that drives the rear wheel 150R. The axle apparatus 1 includes an axle housing 2 and an oil circulating device 10. The axle apparatus 1 is a mechanical apparatus including the axle housing 2 in which machine parts are housed. The axle housing 2 is supported by the vehicle body frame 110 via a suspension device 160.

The axle apparatus 1 includes the axle housing 2, a differential 6, a wet multiple disc brake device 7, a planetary gear speed reducer 8, a transmission shaft 4, an axle shaft 5, and the oil circulating device 10. The differential 6 is disposed in an inside 2H of the axle housing 2 and coupled to a drive shaft 3. The wet multiple disc brake device 7 is disposed in the inside 2H of the axle housing 2. The planetary gear speed reducer 8 is disposed in the inside 2H of the axle housing 2. The transmission shaft 4 receives a transmitted rotating force of the drive shaft 3 via the differential 6. The axle shaft 5 receives a transmitted rotating force of the transmission shaft 4. The oil circulating device 10 circulates oil for immersing the machine parts disposed in the inside of the axle housing 2. In the axle apparatus 1, rotation of the axle shaft 5 drives the rear wheel 150R of the dump truck 100.

The axle housing 2 includes a differential body 2B, a right axle housing 2R, and a left axle housing 2L. The differential body 2B houses the differential 6 and the wet multiple disc brake device 7. The right axle housing 2R and the left axle housing 2L each house the planetary gear speed reducer 8.

The differential body 2B includes a drive shaft opening 47, an axle shaft opening 49R, and an axle shaft opening 49L. The drive shaft opening 47 is disposed on the front side, the axle shaft opening 49R on the right side, and the axle shaft opening 49L on the left side. The differential body 2B includes a pinion cage 19 at the drive shaft opening 47. The pinion cage 19 rotatably supports the drive shaft 3 via a first input bearing 3$a$ and a second input bearing 3$b$. The drive shaft 3 rotates by the drive force generated by the engine. The drive shaft 3 extends in the front-back direction and rotates around a rotation axis BX. The rotation axis BX extends in the front-back direction.

A coupling 48 is fixed to an end of the drive shaft 3. The drive shaft 3 is coupled to a propeller shaft (not illustrated) via the coupling 48. The drive force generated by the engine is transmitted to the propeller shaft via the transmission device. The propeller shaft rotates around the rotation axis BX on the basis of the drive force generated by the engine. Rotation of the propeller shaft around the rotation axis BX causes the drive shaft 3, which is coupled to the propeller shaft via the coupling 48, to rotate around the rotation axis BX.

The drive shaft 3 includes a drive pinion gear 9. The differential 6 includes a bevel gear 11 meshed with the drive pinion gear 9 and a differential case 12 coupled to the bevel gear 11.

A side gear 15 is fixed to the transmission shaft 4. The transmission shaft 4 is provided on each of the right and left sides. The transmission shaft 4 is rotatably supported by the differential body 2B via a first differential side bearing 4$a$ and a second differential side bearing 4$b$. The first differential side bearing 4$a$ supports the transmission shaft 4 on the left side. The second differential side bearing 4$b$ supports the transmission shaft 4 on the right side. The side gear 15 is coupled to the transmission shaft 4 through a spline coupling. The side gear 15 and the transmission shaft 4 rotate around the rotation axis AX. The wet multiple disc brake device 7 is provided between the transmission shaft 4 and the differential body 2B.

The planetary gear speed reducer 8 is provided further outside than the wet multiple disc brake device 7 in the vehicle width direction. The planetary gear speed reducer 8 decelerates the rotation of the transmission shaft 4. The rotating force of the transmission shaft 4 is transmitted to the axle shaft 5. Rotation of the axle shaft 5 around the rotation axis AX causes the rear wheel 150R, which is connected to the axle shaft 5, to rotate around the rotation axis AX.

As described above, the rotation axis AX of the bevel gear 11, the rotation axis AX of the transmission shaft 4, and the rotation axis AX of the axle shaft 5 are coincident with one another. The bevel gear 11 rotates around the rotation axis AX of the transmission shaft 4.

The differential body 2B includes a flange section 18. The flange section 18 is disposed while projecting outward in a radiation direction with respect to the rotation axis BX. A discharge port 22 and inflow ports 23 and 24 are disposed on a front surface of the flange section 18. Furthermore, an inflow port 25 is disposed on a front surface of the pinion cage 19. The discharge port 22 and the inflow ports 23, 24, and 25 connect the inside and outside of the axle housing 2. The discharge port 22 discharges the oil supplied to the machine parts. The inflow ports 23, 24, and 25 allow the oil to be supplied to the machine parts to flow into the inside of the axle housing 2.

The inflow ports 23, 24, and 25 are disposed above a fluid level Q of oil (refer to FIG. 4, 7, or the like) retained inside the axle housing 2. In the present embodiment, the inflow ports 23, 24, and 25 are disposed, for example, above the rotation axis BX of the drive shaft 3. The inflow port 23 and the inflow port 24 are disposed at positions sandwiching the bevel gear 11 in an axial direction of the rotation axis AX of the transmission shaft 4. For example, the inflow port 23 is disposed further to the right than the bevel gear 11. Furthermore, the inflow port 24 is disposed further to the left than the bevel gear 11.

The inflow ports 23, 24, and 25 are disposed at height positions corresponding to the machine parts to which the oil is supplied. For example, the oil to be supplied to the second input bearing 3b and the second differential side bearing 4b flows into the inflow port 23. Therefore, the inflow port 23 is disposed at a position corresponding to the height positions of the above-described second input bearing 3b and second differential side bearing 4b. Furthermore, for example, the oil to be supplied to the above-described first differential side bearing 4a flows into the inflow port 24. Therefore, the inflow port 24 is disposed at a position corresponding to the height position of the first differential side bearing 4a. For example, the inflow ports 23 and 24 may be disposed at positions corresponding to a ball of each bearing. Furthermore, in a case where an oil supply destination is a gear, the inflow ports 23 and 24 may be disposed at positions corresponding to the gear. Furthermore, for example, the oil to be supplied to the above-described first input bearing 3a flows into the inflow port 25. Therefore, the inflow port 25 is disposed at a position corresponding to the height position of the first input bearing 3a.

The oil circulating device 10 includes a filter 20, a discharge pipe 30, a supply pipe 40, and a pump 50. The filter 20 removes foreign substances contained in the oil to be supplied to the machine parts. The filter 20 filters the oil and removes the foreign substances. The filter 20 is disposed, for example, at a position not interfering with an obstacle, removed soil and sand or the like. For example, the filter 20 is disposed on a back surface of the differential body 2B. In this case, since no shielding object exists behind the filter 20, replacement of the filter 20 is facilitated. Note that the disposition of the filter 20 is not limited to the back surface of the differential body 2B.

The discharge pipe 30 connects the discharge port 22 of the axle housing 2 and the filter 20. The discharge pipe 30 introduces, to the filter 20, oil discharged from the discharge port 22.

The supply pipe 40 connects the filter 20 and the inflow ports 23, 24, and 25 of the axle housing 2. The supply pipe 40 introduces, to the inflow ports 23, 24, and 25, the oil from which foreign substances have been removed by the filter 20. The supply pipe 40 includes a return pipe 41, a branch unit 42, and branch pipes 43, 44, and 45. The return pipe 41 is connected to the filter 20 and introduces, to the branch unit 42, the oil from which foreign substances have been removed by the filter 20.

The pump 50 is disposed, for example, on a back surface of the differential body 2B. In this case, since no shielding object exists behind the pump 50, maintenance such as replacement of the pump 50 is facilitated. Note that the disposition of the pump 50 is not limited to the back surface of the differential body 2B. Furthermore, in a case where a key for the vehicle is turned on, the engine starts and the pump 50 rotates. On the other hand, in a case where the key for the vehicle is turned off, the engine stops and the pump 50 stops.

Figure 5:
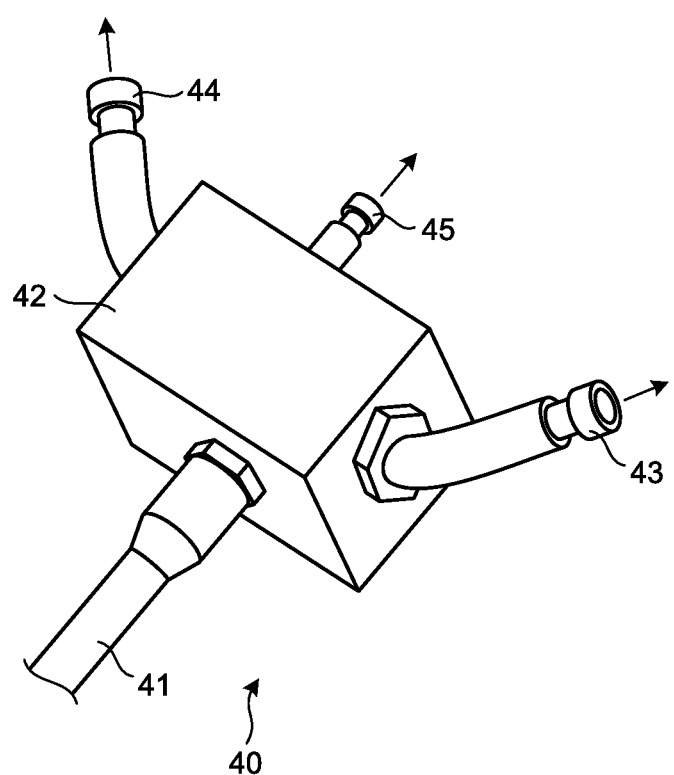
FIG. 5 is a perspective view illustrating an example of a branch unit.

FIG. 5 is a perspective view illustrating an example of the branch unit 42. The branch unit 42 is disposed on a top surface of the differential body 2B. The branch unit 42 is disposed, for example, at a center section of the differential body 2B in the axial direction of the rotation axis AX. In this case, the pipe length of the branch pipes 43, 44, and 45, which will be described later, can be shortened. Note that the position of the branch unit 42 is not limited to the above-described position. In the branch unit 42, three-way flow passages are formed. In the present embodiment, the flow passages in the branch unit 42 may be the same in diameter and flow passage length. Alternatively, at least one of the flow passages may be different from the others. A diameter and a flow passage length of each flow passage are set, for example, according to an amount of oil that needs to be supplied to a machine part that is a supply destination.

The branch pipes 43, 44, and 45 are each connected to a corresponding flow passage of the branch unit 42. The branch pipe 43 is connected to the inflow port 23. The branch pipe 44 is connected to the inflow port 24. The branch pipe 45 is connected to the inflow port 25. Therefore, the supply pipe 40 is branched into the branch pipes 43, 44, and 45 by the branch unit 42 outside the axle housing 2, and connected to the inflow ports 23, 24, and 25.

Figure 6:
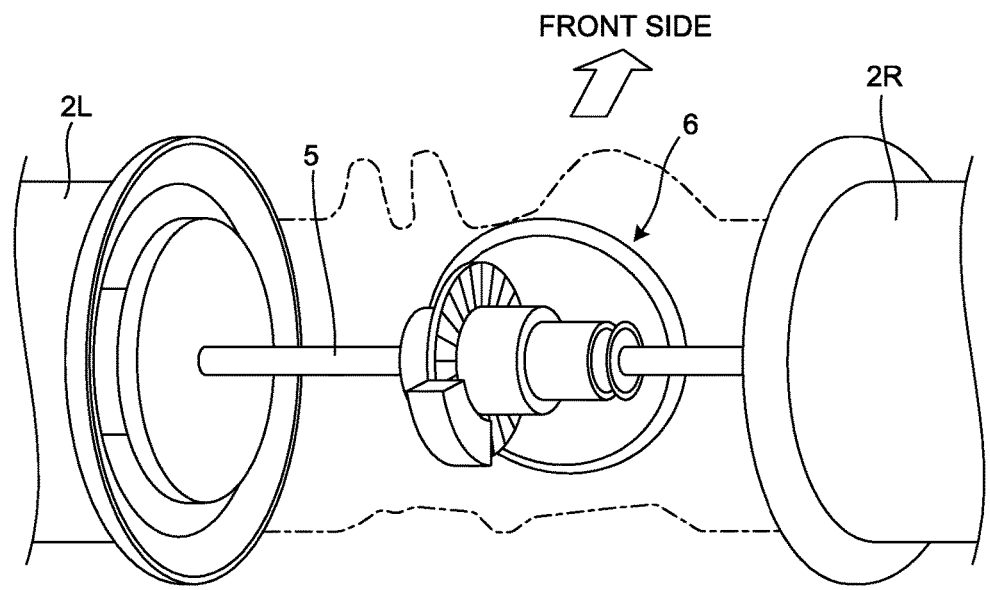
FIG. 6 is a perspective view illustrating an exemplary internal configuration of an axle housing.
Figure 7:
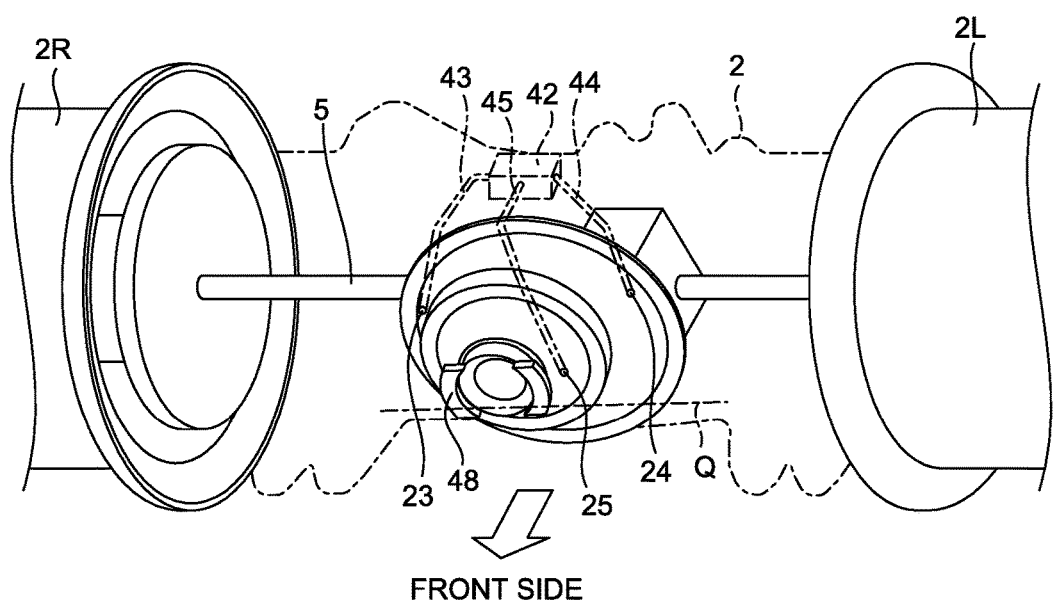
FIG. 7 is a perspective view illustrating an exemplary internal configuration of the axle housing.
Figure 8:
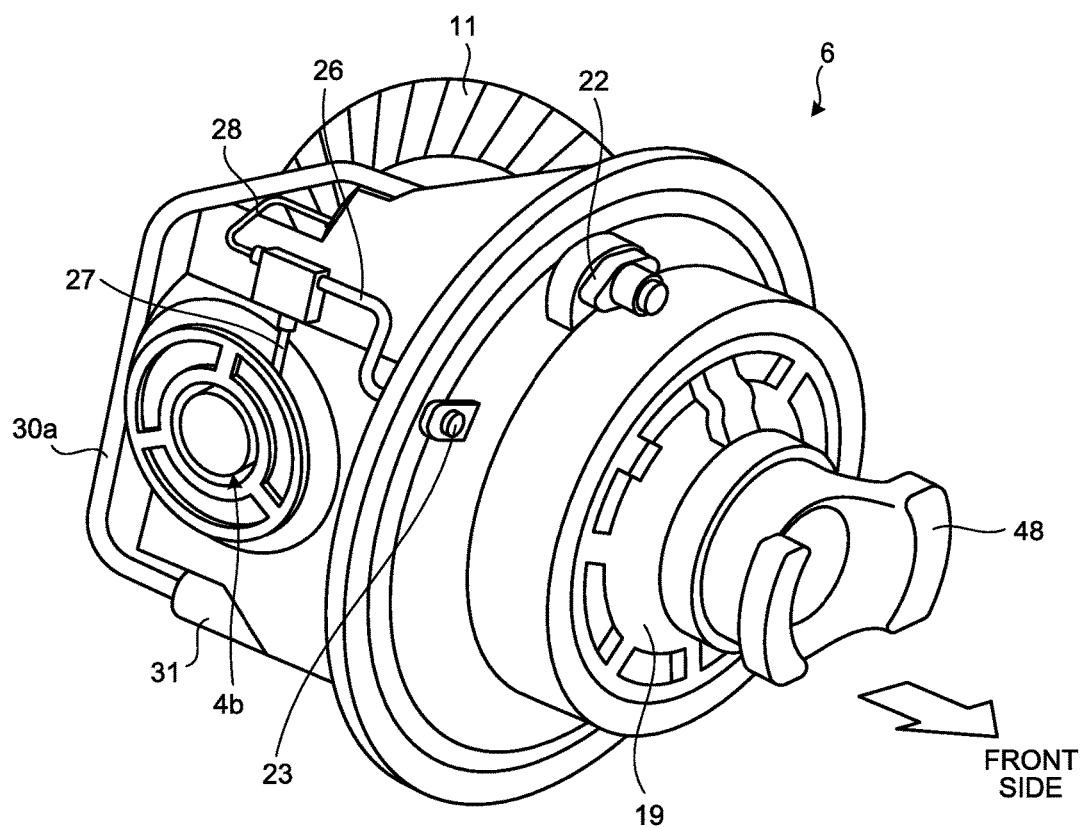
FIG. 8 is a perspective view illustrating an enlarged differential.
Figure 9:
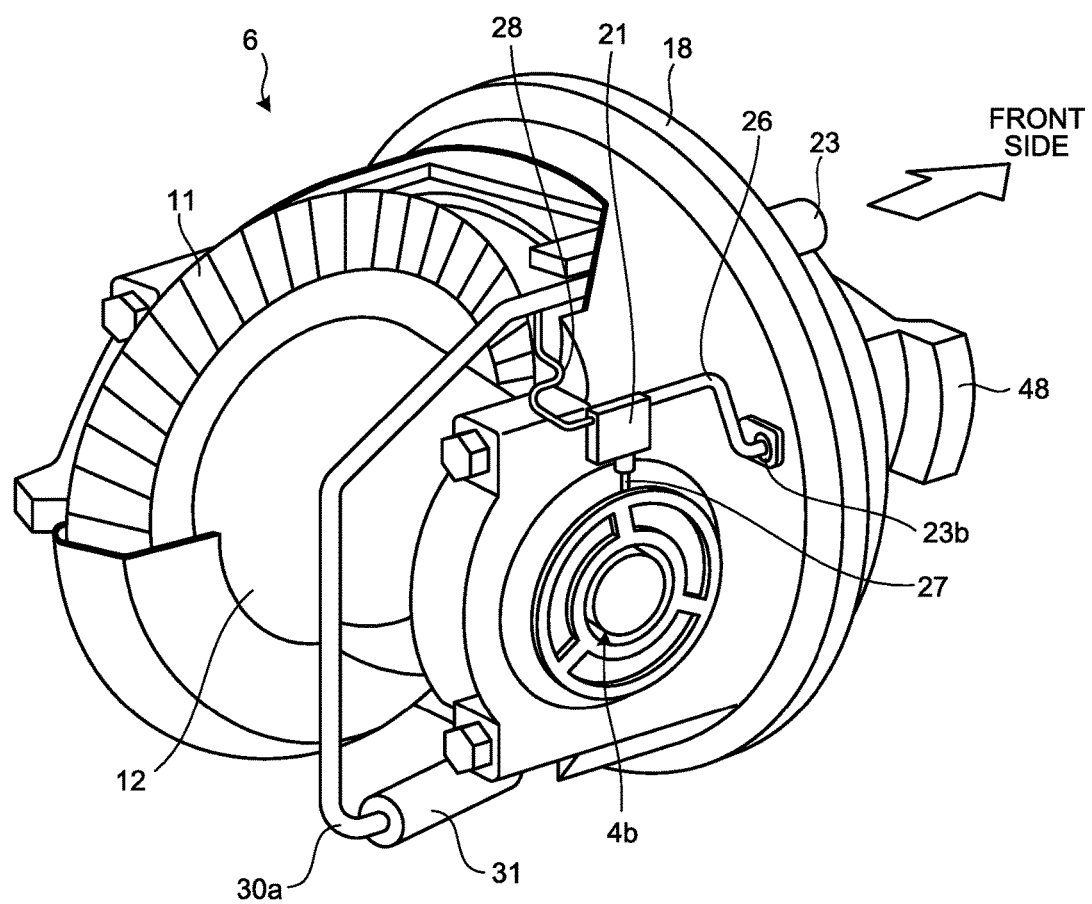
FIG. 9 is a perspective view illustrating the enlarged differential.
Figure 10:
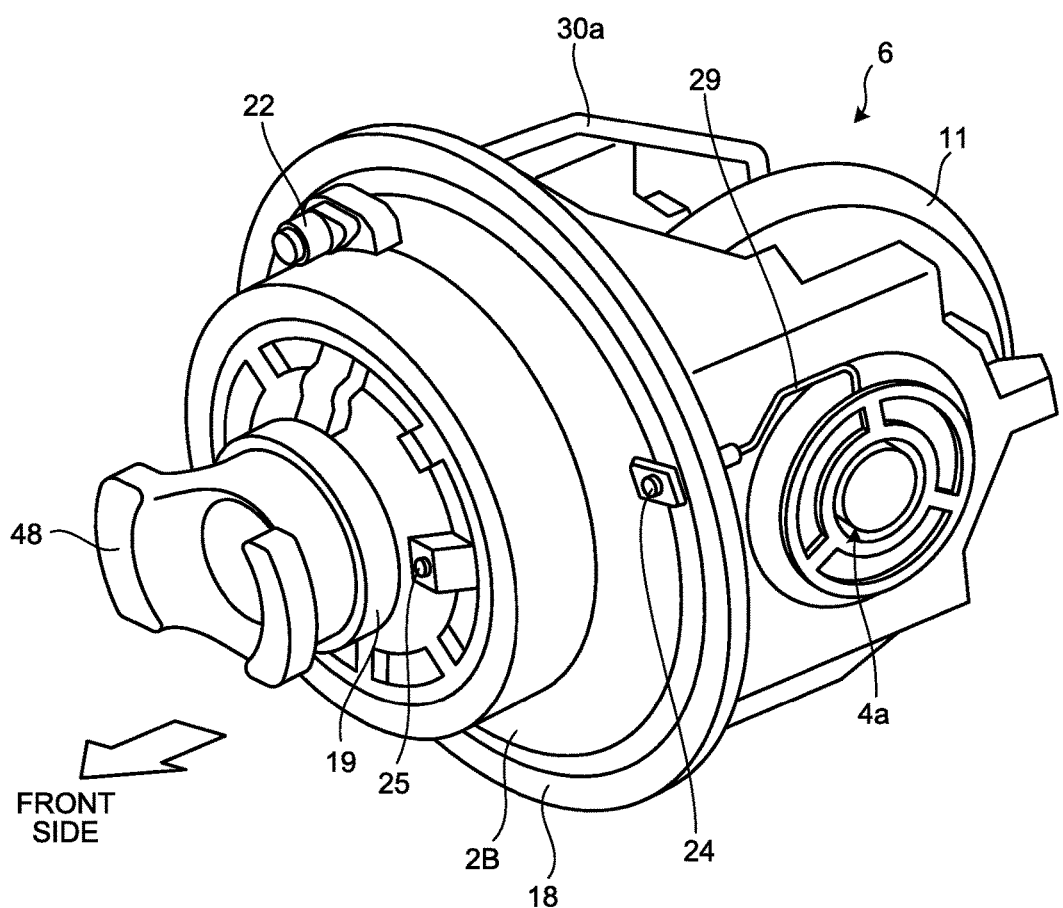
FIG. 10 is a perspective view illustrating the enlarged differential.
Figure 11:
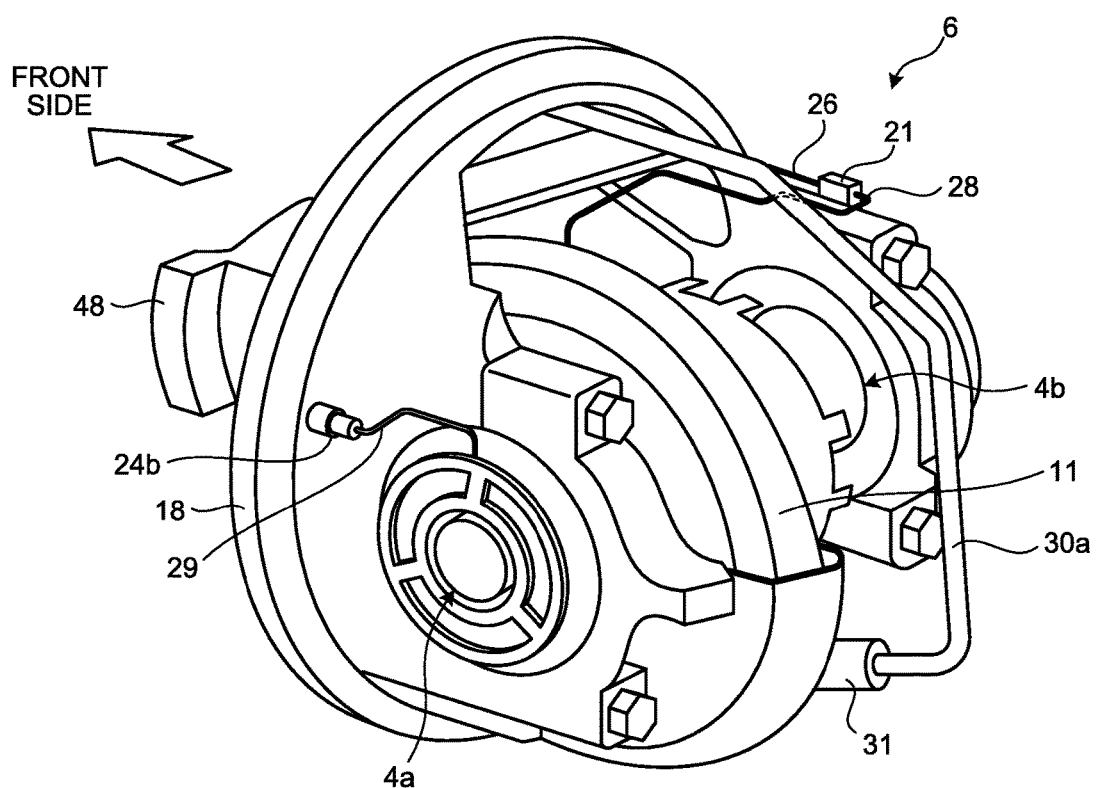
FIG. 11 is a perspective view illustrating the enlarged differential.

FIGS. 6 and 7 are perspective views illustrating an exemplary internal configuration of the axle housing 2. FIG. 6 is a view illustrating the exemplary internal configuration of the axle housing 2, as viewed from the back side, and FIG. 7 is a view from the front side. FIGS. 8 to 11 are perspective views illustrating an enlarged differential 6. FIG. 8 is a view of the differential 6, as viewed from the right front side, FIG. 9 is a view from the right back side, FIG. 10 is a view from the left front side, and FIG. 11 is a view from the left back side.

An internal discharge pipe 30a and internal pipes 26 and 29 are disposed in the inside 2H of the axle housing 2. One end of the internal discharge pipe 30a is connected to the discharge port 22, and the other end thereof is connected to a strainer 31. The internal discharge pipe 30a introduces, to the discharge port 22, the oil sucked out from the strainer 31.

The internal pipe 26 is connected to the inflow port 23. The internal pipe 26 introduces, to the second differential side bearing 4b and the second input bearing 3b, the oil that flows in from the inflow port 23. The internal pipe 29 is connected to the inflow port 24. The internal pipe 29 introduces, to the first differential side bearing 4a, the oil that flows in from the inflow port 24.

In the present embodiment, the inflow port 23 and the inflow port 24 are disposed at positions sandwiching the bevel gear 11 in the axial direction of the rotation axis AX. Therefore, the internal pipes 26 and 29 connected to the inflow ports 23 and 24 can be each disposed without crossing the bevel gear 11 in the axial direction of the rotation axis AX. In this case, there is no need to provide a space for disposing the internal pipe between the differential body 2B and the bevel gear 11, and thus enlargement of the axle housing 2 can be suppressed.

Figure 12:
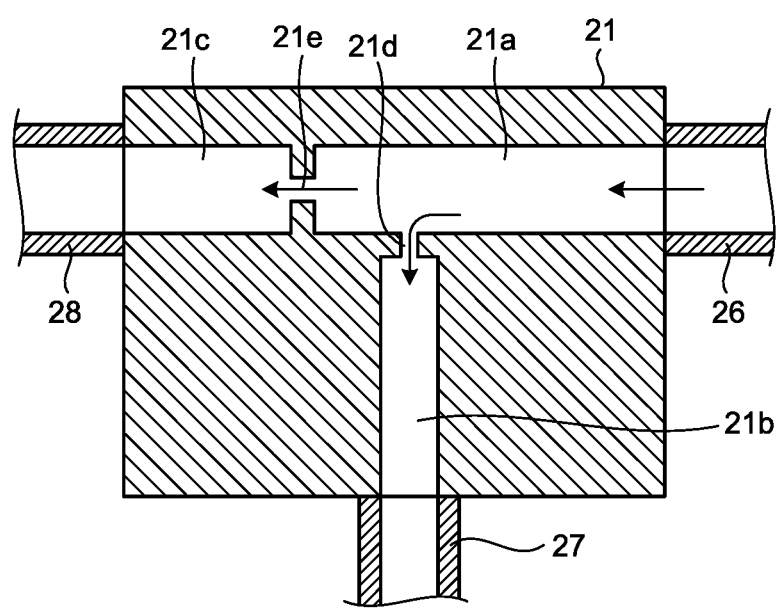
FIG. 12 is a cross-sectional view illustrating an internal configuration of the branch unit.

The internal pipe 26 is disposed on the right side of the differential 6. The internal pipe 26 is connected to an opening part 23b and extended backward along an external wall of the differential body 2B. The opening part 23b is part of the inflow port 23 and disposed on a back surface side of the flange section 18. The internal pipe 26 is connected to a branch unit 21. The internal pipe 26, an internal pipe 27, and an internal pipe 28 are connected to the branch unit 21. FIG. 12 is a cross-sectional view illustrating an internal configuration of the branch unit 21. The branch unit 21 includes an inflow-side flow passage 21a, a first branch flow passage 21b, and a second branch flow passage 21c. The inflow-side flow passage 21a is connected to the internal pipe 26. The first branch flow passage 21b is connected to the internal pipe 27. The second branch flow passage 21c is connected to the internal pipe 28.

An orifice section 21d is provided between the inflow-side flow passage 21a and the first branch flow passage 21b. Furthermore, an orifice section 21e is provided between the inflow-side flow passage 21a and the second branch flow passage 21c. The orifice sections 21d and 21e have a smaller inner diameter than those of the inflow-side flow passage 21a, the first branch flow passage 21b, and the second branch flow passage 21c. With this smaller diameter, the orifice sections 21d and 21e adjust a flow rate of the oil that flows in the first branch flow passage 21b and the second branch flow passage 21c. The flow rate in the orifice sections 21d and 21e can be set, for example, on the basis of a size and a rotation speed of a bearing to which the oil is supplied.

In the orifice sections 21d and 21e, the flow rate of the oil is adjusted. Thus, a flow rate of the oil can be adjusted in each of the internal pipes 26, 27, and 28 without changing the inner diameter thereof. Therefore, each pipe has a configuration in which a flow passage resistance is suppressed. Furthermore, in each pipe, the oil can circulate stably even in a case where the temperature decreases and the viscosity changes. According to the present embodiment, a diameter of the internal pipe 26 is larger than diameters of the internal pipes 27 and 28, and the diameters of the internal pipes 27 and 28 are substantially equal to each other. However, the embodiment is not limited to this configuration.

Figure 13:
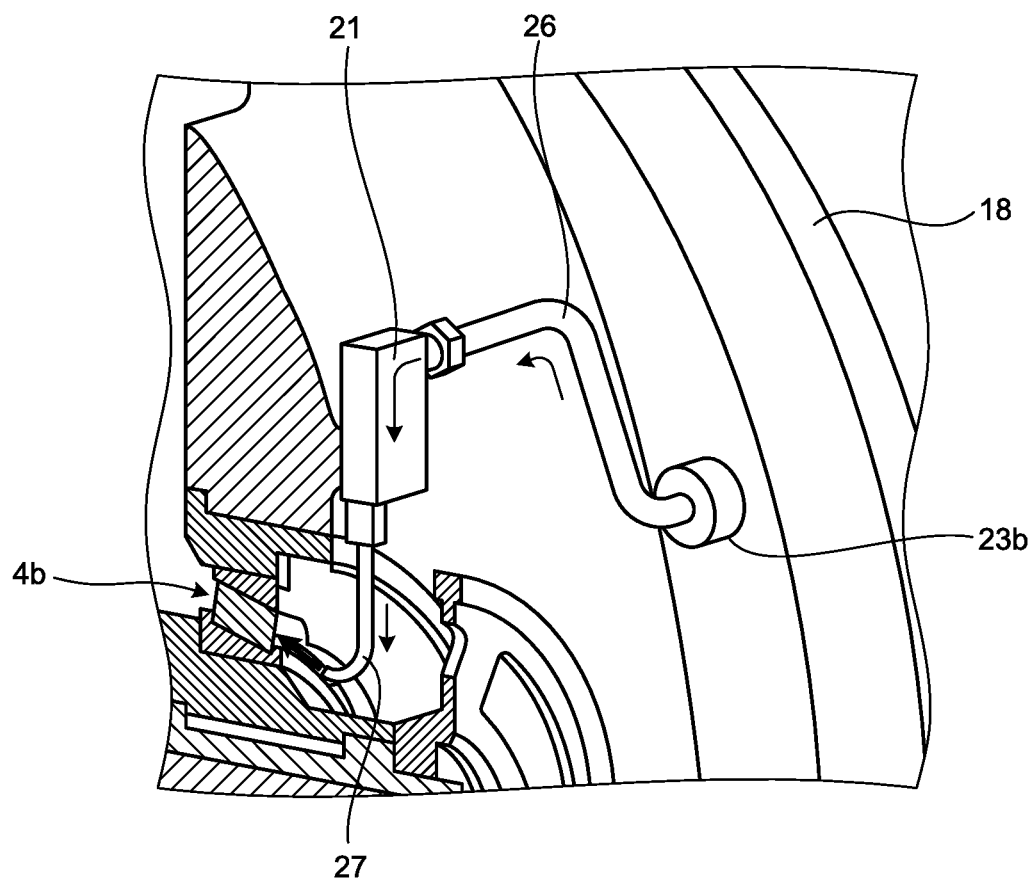
FIG. 13 is a perspective view illustrating an example of the branch unit and a branch pipe.

FIG. 13 is a perspective view illustrating an example of the branch unit 21 and the internal pipe 27. As illustrated in FIG. 13, the internal pipe 27 is connected to the first branch flow passage 21b of the branch unit 21. The internal pipe 27 is extended downward from the branch unit 21 and routed to the second differential side bearing 4b. The internal pipe 27 introduces, to the second differential side bearing 4b, the oil that flows in from the inflow port 23 and is branched off at the branch unit 21.

Figure 14:
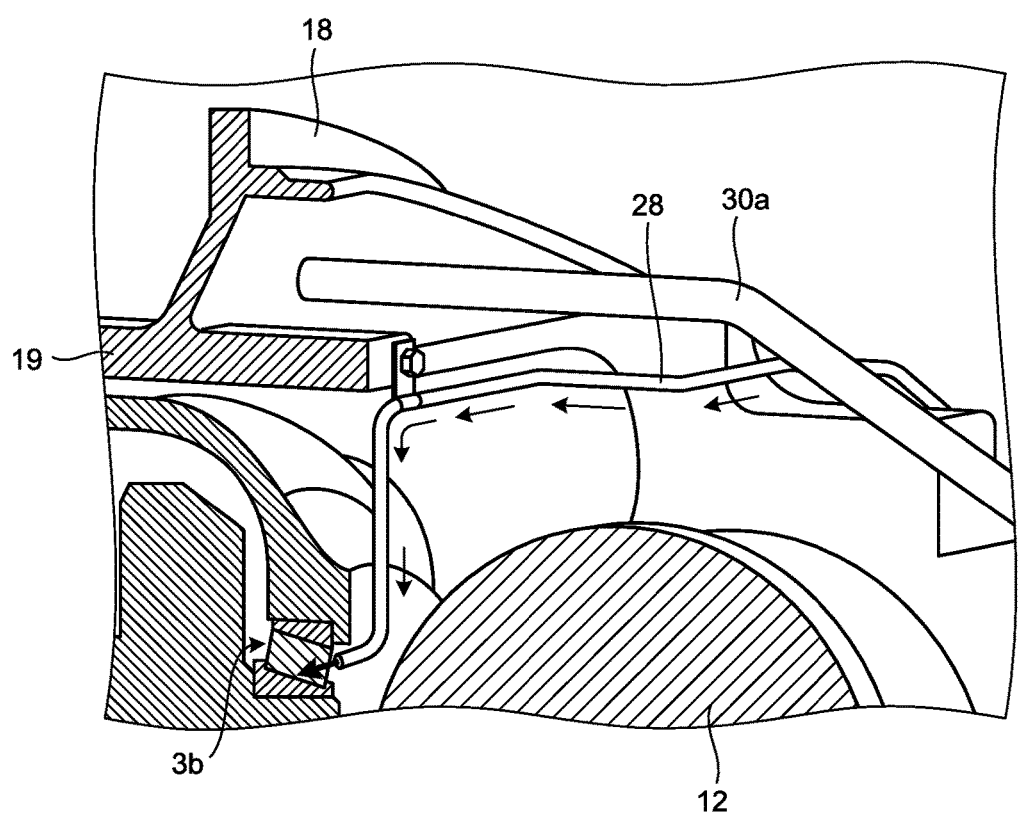
FIG. 14 is a perspective view illustrating an example of an internal pipe.

FIG. 14 is a perspective view illustrating an example of the internal pipe 28. The internal pipe 28 is connected to the second branch flow passage 21c of the branch unit 21. The internal pipe 28 is extended backward from the branch unit 21, is bent to the left side in the vehicle width direction beyond the external wall of the differential body 2B, and routed to the second input bearing 3b. The internal pipe 28 introduces, to the second input bearing 3b, the oil that flows in from the inflow port 23 and is branched off at the branch unit 21.

The second input bearing 3b may be smaller in size than the first input bearing 3a. Furthermore, the second differential side bearing 4b may be smaller in size than the first differential side bearing 4a. In such a case, an amount of the oil needed in the second input bearing 3b is lower than that in the first input bearing 3a, and an amount of the oil needed in the second differential side bearing 4b is lower than that in the first differential side bearing 4a. According to the present embodiment, there is branched off the internal pipe 26 that supplies the oil to the second input bearing 3b and the second differential side bearing 4b that need a less amount of the oil. Thus, an adequate amount of the oil can be supplied according to a necessary amount of the oil.

Figure 15:
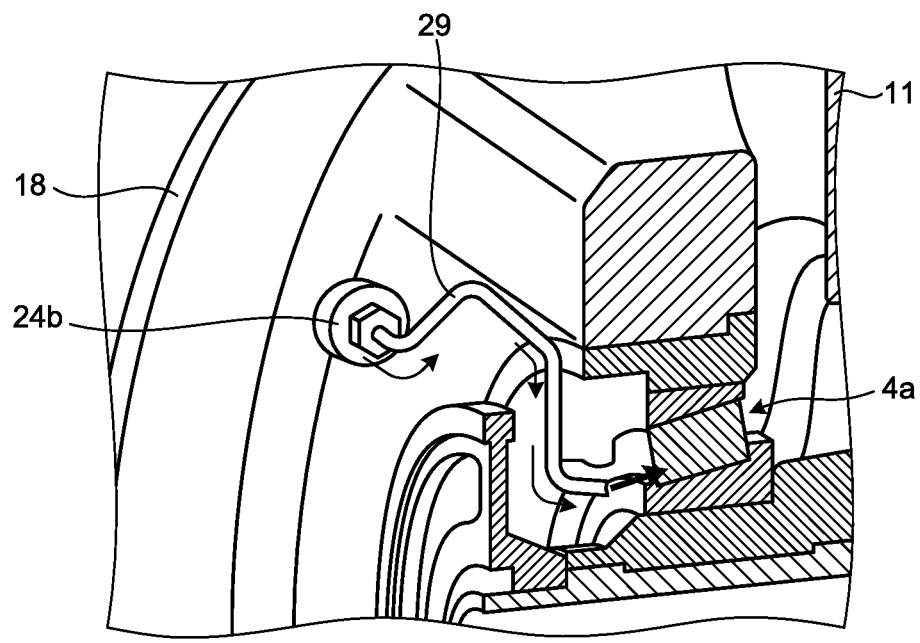
FIG. 15 is a perspective view illustrating an example of the internal pipe.

FIG. 15 is a perspective view illustrating an example of the internal pipe 29. The internal pipe 29 is disposed on the left side of the differential 6. The internal pipe 29 is connected to an opening part 24b and extended backward along the external wall of the differential body 2B. The opening part 24b is part of the inflow port 24 and disposed on the back surface side of the flange section 18. The internal pipe 29 is routed to the first differential side bearing 4a. The internal pipe 29 introduces, to the first differential side bearing 4a, the oil that has flowed in from the inflow port 24.

Figure 16:
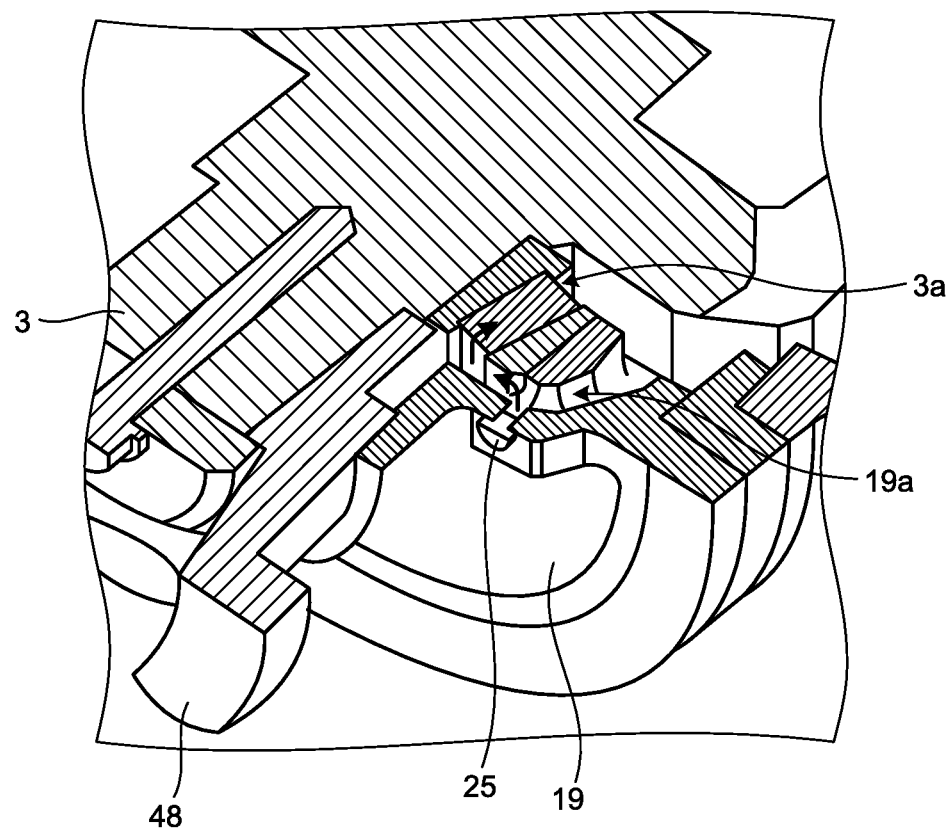
FIG. 16 is a perspective view illustrating an exemplary internal configuration of an inflow port.

FIG. 16 is a perspective view illustrating an exemplary internal configuration of the inflow port 25. The inflow port 25 penetrates a front surface side of the pinion cage 19, and communicates with an internal flow passage 19a. The internal flow passage 19a is formed inside the pinion cage 19, and introduces, to the first input bearing 3a, the oil that has flowed in from the inflow port 25. As described above, the inflow port 25 is disposed at a front surface position of the axle housing 2 that is a position at which the oil can be supplied directly to the first input bearing 3a disposed on the front side.

As described above, the axle apparatus 1 according to the present embodiment includes the axle housing 2, the filter 20, the discharge pipe 30, the supply pipe 40, and the pump 50. The axle housing 2 has the inside 2H in which the machine parts are disposed, and includes the discharge port 22 from which the oil supplied to the machine parts is discharged, and a plurality of the inflow ports 23, 24, and 25 to which the oil is supplied. The filter 20 is disposed outside the axle housing 2. The discharge pipe 30 connects the discharge port 22 of the axle housing 2 and the filter 20. One end side of the supply pipe 40 is connected to the filter 20, and the other end side thereof branches off and is connected to the plurality of inflow ports 23, 24, and 25. The pump 50 causes the oil to circulate from the axle housing 2 to the filter 20 via the discharge pipe 30 and causes the oil from the filter 20 to the axle housing 2 via the supply pipe 40.

According to the present embodiment, the oil from which foreign substances have been removed by the filter 20 flows into the plurality of inflow ports 23, 24, and 25 of the axle housing 2 via the branch pipes 43, 44, and 45 of the supply pipe 40. Therefore, the flow passage of the oil from the inflow port to the machine parts (e.g., internal pipes 26 and 29) can be distributed inside the axle housing 2. This allows the provision of the axle apparatus 1 capable of suppressing complication of the internal configuration and saving a space.

In the axle apparatus 1 according to the present embodiment, the inflow ports 23, 24, and 25 are disposed above the fluid level Q of oil retained in the inside 2H of the axle housing 2. This suppresses discharge of the oil from the inflow ports 23, 24, and 25, and allows smooth supply of the oil to each machine part.

In the axle apparatus 1 according to the present embodiment, the inflow ports 23, 24, and 25 are disposed at height positions corresponding to the machine parts to which the oil is supplied. This suppresses elongation, in the up-down direction, of the flow passage of the oil in the inside 2H of the axle housing 2, and thus the internal configuration can be simplified.

In the axle apparatus 1 according to the present embodiment, the axle housing 2 internally includes the internal pipes 26 and 29 that introduce, to the machine parts, the oil that flows in from the inflow ports 23 and 24. The internal pipes 26 and 29 are disposed at the plurality of inflow ports 23 and 24, respectively. This allows efficiently introducing the oil that flows in from the inflow ports 23 and 24 to the machine parts.

In the axle apparatus 1 according to the present embodiment, the axle housing 2 internally includes the differential 6 and the transmission shaft 4. The differential 6 is coupled to the drive shaft 3 that rotates by the drive force generated by the engine. The transmission shaft 4 receives a transmitted rotating force of the drive shaft 3 via the differential 6. The differential 6 has the bevel gear 11 that rotates around the rotation axis BX of the drive shaft 3. The inflow ports 23 and 24 are disposed at positions sandwiching the bevel gear 11 in the axial direction of the rotation axis AX of the transmission shaft 4. With this disposition, a supply flow passage of the oil in the inside 2H of the axle housing 2 is disposed without crossing the bevel gear 11. This suppresses a space needed to route the internal pipes, and thus enlargement of the axle housing 2 can be suppressed.

In the axle apparatus 1 according to the present embodiment, the axle housing 2 includes the first differential side bearing 4a and the second differential side bearing 4b that rotatably support the transmission shaft 4. The inflow port 24 into which the oil to be supplied to the first differential side bearing 4a flows is different from the inflow port 23 into which the oil to be supplied to the second differential side bearing 4b flows. This can suppress a space needed to route the internal pipes 26 and 29, and thus enlargement of the axle housing 2 can be suppressed, in a case where the oil is supplied to the first differential side bearing 4a and the second differential side bearing 4b that are disposed so as to sandwich the bevel gear 11 in the axial direction of the rotation axis AX.

In the axle apparatus 1 according to the present embodiment, the inflow port 25 is disposed at a position at which the oil can be supplied directly to the machine parts. With this disposition, the oil can be supplied to the machine parts without providing the internal pipe. As described above, a plurality of inflow ports is provided, and thus there can be secured a supply port capable of directly supplying the oil without providing the internal pipe.

In the axle apparatus 1 according to the present embodiment, the axle housing 2 internally includes the differential 6, the first input bearing 3a, and the second input bearing 3b. The differential 6 is coupled to the drive shaft 3 that rotates by the drive force generated by the engine. The first input bearing 3a and the second input bearing 3b are disposed while being spaced from each other in the axial direction of the rotation axis BX of the drive shaft 3, and rotatably support the drive shaft 3. At least one inflow port 25 is disposed at a front surface position of the axle housing 2 that is a position at which the oil can be supplied directly to the first input bearing 3a disposed on the front side. With this disposition, the oil can be supplied to the first input bearing 3a without providing the internal pipe. As described above, a plurality of inflow ports is provided, and thus there can be secured a supply port capable of directly supplying the oil without providing the internal pipe.

The technical scope of the present invention is not limited to the embodiment described above. Modifications can be added accordingly to the embodiment within the scope not departing from the spirit of the present invention. For example, in the embodiment described above, description has been given, taking as an example the configuration in which the oil that flows in from the inflow port 25 is supplied directly to the first input bearing 3a. However, the embodiment is not limited to this configuration. There may be employed a configuration in which the oil is supplied to the first input bearing 3a via the internal pipe.

Furthermore, similarly for the inflow ports into which the oil supplied to the second input bearing 3b, the first differential side bearing 4a, and the second differential side bearing 4b flows, there may be employed a configuration in which the oil is supplied directly to the machine parts without involving the internal pipe.

Furthermore, in the embodiment described above, description has been given exemplifying a plurality of inflow ports using the three inflow ports 23, 24, and 25. However, any other inflow port may be provided. Furthermore, the disposition and the oil supply destinations of the inflow ports 23, 24, and 25 are not limited to the above. Any other mode may be employed.

Furthermore, in the embodiment described above, description has been given, taking as an example the configuration in which the inflow port 23 and the inflow port 24 are disposed at positions sandwiching the bevel gear 11 in the axial direction of the rotation axis AX. However, the embodiment is not limited to this configuration. For example, there may be employed a configuration in which the inflow ports are all disposed either on the right or the left of the bevel gear 11 in the axial direction of the rotation axis AX.

Furthermore, in the embodiment described above, description has been given, taking as an example the configuration in which the branch unit 21 is disposed at a branch part of the internal pipe 26, and the orifice sections 21d and 21e are formed at the branch unit 21. However, the embodiment is not limited to this configuration. For example, there may be employed a configuration in which the branch unit 21 is not provided, and the internal pipe 26 is branched directly into the internal pipes 27 and 28. Furthermore, the orifice sections may be provided at the branch unit 42 from which the supply pipe 40 branches off. In this case, since the flow rate is adjusted before the oil flows into the plurality of inflow ports, there is no need to make the internal pipe branch off, and a space can be saved.

REFERENCE SIGNS LIST

Q Fluid level
AX, BX Rotation axis
1 Axle apparatus
2 Axle housing
2B Differential body
2H Inside
2L Left axle housing
2R Right axle housing
3 Drive shaft
3a First input bearing
3b Second input bearing
4 Transmission shaft
4a First differential side bearing
4b Second differential side bearing
5 Axle shaft
6 Differential
8 Planetary gear speed reducer
9 Drive pinion gear
10 Oil circulating device
11 Bevel gear
12 Differential case
15 Side gear
18 Flange section 19 Pinion cage
19a Internal flow passage
20 Filter
21, 42 Branch unit
21a Inflow-side flow passage
21d, 21e Orifice section
22 Discharge port
23, 24, 25 Inflow port
23b, 24b Opening part
26, 27, 28, 29 Internal pipe
43, 44, 45 Branch pipe
30 Discharge pipe
40 Supply pipe
41 Pipe
47 Drive shaft opening
48 Coupling
49L, 49R Axle shaft opening
50 Pump
100 Work vehicle, dump truck
110 Vehicle body frame
120 Dump body
130 Travel device
140 Tire
150 Wheel
150F Front wheel
150R Rear wheel
160 Suspension device

The invention claimed is:

1. An axle apparatus, comprising:
an axle housing in which a machine part is disposed, the axle housing including a discharge port that discharges oil supplied to the machine part and a plurality of inflow ports into which the oil flows;
a filter disposed outside the axle housing;
a discharge pipe connecting the discharge port of the axle housing and the filter;
a supply pipe of which one end side is connected to the filter, the other end side of the supply pipe being branched off and connected to the plurality of inflow ports; and
a pump that causes the oil to circulate from the axle housing to the filter via the discharge pipe, and causes the oil to circulate from the filter to the axle housing via the supply pipe.

2. The axle apparatus according to claim 1, wherein the plurality of inflow ports is disposed above a fluid level of the oil retained inside the axle housing.

3. The axle apparatus according to claim 1, wherein at least one of the inflow ports is disposed at a position corresponding to a rotating section or a sliding section of the machine part to which the oil is supplied.

4. The axle apparatus according to claim 1, wherein the axle housing internally includes an internal pipe that introduces, to the machine part, the oil that flows in from at least one of the inflow ports.

5. The axle apparatus according to claim 4, wherein the at least one internal pipe is provided while being branched off, and
an orifice section that adjusts a flow rate of the oil is formed at a branch part of the internal pipe.

6. The axle apparatus according to claim 1, wherein the axle housing internally includes:
a differential coupled to a drive shaft that rotates by a drive force generated by an engine; and
a transmission shaft to which a rotating force of the drive shaft is transmitted via the differential,
the differential includes a bevel gear that rotates around a rotation axis of the transmission shaft, and
the plurality of inflow ports is disposed at positions sandwiching the bevel gear in an axial direction of the rotation axis of the transmission shaft.

7. The axle apparatus according to claim 6, wherein the axle housing includes two differential side bearings disposed so as to sandwich the bevel gear in the axial direction of the rotation axis of the transmission shaft, the differential side bearings rotatably supporting the transmission shaft, and
one of the inflow ports into which the oil to be supplied to a first differential side bearing of the differential side bearings flows is different from another of the inflow ports into which the oil to be supplied to a second differential side bearing of the differential side bearings flows.

8. The axle apparatus according to claim 1, wherein the axle housing internally includes:
a differential coupled to a drive shaft that rotates by a drive force generated by an engine; and
two input bearings disposed while being spaced from each other in an axial direction of a rotation axis of the drive shaft, the two input bearings rotatably supporting the drive shaft, and
at least one of the inflow ports is disposed at a front surface position of the axle housing, the front surface position being a position at which the oil is capable of being supplied directly to the input bearing, among the two input bearings, that is disposed on a front side.

* * * * *